(12) United States Patent
Pyle et al.

(10) Patent No.: US 12,526,185 B2
(45) Date of Patent: Jan. 13, 2026

(54) COMPUTER SYSTEM AND METHOD FOR COMMISSIONING NETWORK ASSETS

(71) Applicant: Schneider Electric USA, Inc., Andover, MA (US)

(72) Inventors: Michael William Pyle, Hermitage, TN (US); Gregg Reavis, Andover, MA (US); Daniel Andre Paillet, Andover, MA (US)

(73) Assignee: Schneider Electric USA, Inc., Boston, MA (US)

( * ) Notice: Subject to any disclaimer, the term of this patent is extended or adjusted under 35 U.S.C. 154(b) by 91 days.

(21) Appl. No.: 18/652,254

(22) Filed: May 1, 2024

(65) Prior Publication Data

US 2025/0343727 A1    Nov. 6, 2025

(51) Int. Cl.
| | |
|---|---|
| *H04L 41/0806* | (2022.01) |
| *G06K 7/14* | (2006.01) |
| *H04L 41/0893* | (2022.01) |
| *H04L 61/2596* | (2022.01) |
| *H04L 61/5014* | (2022.01) |

(52) U.S. Cl.
CPC ........ *H04L 41/0806* (2013.01); *G06K 7/1417* (2013.01); *H04L 41/0893* (2013.01); *H04L 61/2596* (2013.01); *H04L 61/5014* (2022.05)

(58) Field of Classification Search
None
See application file for complete search history.

(56) References Cited

U.S. PATENT DOCUMENTS

| | | | |
|---|---|---|---|
| 2003/0165230 A1* | 9/2003 | Reuss | H04M 3/5183 379/265.02 |
| 2007/0268506 A1* | 11/2007 | Zeldin | H04L 41/0806 358/1.13 |

(Continued)

FOREIGN PATENT DOCUMENTS

| | | |
|---|---|---|
| CN | 111065093 B | 4/2020 |
| EP | 1875664 B1 | 2/2010 |

OTHER PUBLICATIONS

Volansys ( An Acl Digital Company ), "Smooth And Effective Device Onboarding Through A Mobile Application", Jul. 31, 2023 (Jul. 31, 2023), Retrieved from the Internet: URL:https://volansys.medium.com/smooth-and-effective-device-onboarding-through-a-mobile-application-78cf7995bfd2 [retrieved on Jul. 14, 2025], 10 Pages.

(Continued)

*Primary Examiner* — Phyllis A Book
(74) *Attorney, Agent, or Firm* — Kinney & Lange, P.A.

(57) ABSTRACT

A computer device and method for automatically generating network configurations for connecting a plurality of network asset devices to a common network. Receiving, in a network configuration device, is metadata associated with each of the plurality of network asset devices to be installed on the common network. Assigning, in the network configuration device, for each of the plurality of network asset devices, a defined functional group consisting of one or more network asset devices. And generating, by the network configuration device, a Dynamic Host Configuration Protocol (DHCP) reservation table defining a subnet mask for configuring the common network for implementation of the plurality of network asset devices for each defined functional group of network asset devices.

20 Claims, 4 Drawing Sheets

(56) References Cited

U.S. PATENT DOCUMENTS

| | | | |
|---|---|---|---|
| 2010/0180016 A1* | 7/2010 | Bugwadia | H04L 41/0869 |
| | | | 713/168 |
| 2013/0275575 A1* | 10/2013 | Hugard, IV | H04W 12/128 |
| | | | 709/224 |
| 2016/0057101 A1* | 2/2016 | Hugard, IV | H04L 63/105 |
| | | | 709/220 |
| 2020/0327175 A1* | 10/2020 | Stephenson | G06F 16/90335 |
| 2021/0119885 A1 | 4/2021 | Flores Guerra | |
| 2022/0311740 A1* | 9/2022 | Gautam | H04L 63/10 |
| 2023/0093190 A1* | 3/2023 | Ramachandran | H04L 41/0668 |
| | | | 709/223 |
| 2024/0396813 A1* | 11/2024 | Littlejohn | H04L 41/0853 |
| 2025/0047701 A1* | 2/2025 | Siddam | H04L 41/22 |

OTHER PUBLICATIONS

Extended European Search Report from EP Application No. 25170793.1, dated Aug. 21, 2025, 34 pages.

* cited by examiner

COMPUTER SYSTEM AND METHOD FOR COMMISSIONING NETWORK ASSETS

BACKGROUND

1. Field

The disclosed embodiments generally relate to a computer-implemented method and system for commissioning network assets, and more particularly, to assigning network addresses and associating assets in functional groupings and determining network configurations for commissioning assets on a network.

2. Description of Related Art

Currently, commissioning of numerous residential and building network coupled asset devices (which includes, but is not limited to: Operational Technology (OT); Industrial Internet of Things (IIOT) and Internet if Things (IoT) assets) ("network asset devices") is often time consuming and prone to error from mis-entry of network asset device configuration data such as network information and association of devices (e.g., a particular camera asset device is to be associated with a particular apartment in a residential building). Additionally, entering of network configuration data is time consuming, adding significantly to the overall cost of system installation.

Thus, there exists a need to provide a system and method that obviates the above mentioned shortcomings of the current method for commissioning network asset devices for use on a network associated with a common infrastructure by providing an efficient and rapid mechanism/method for assigning network IP addresses and associating network asset devices in functional groupings while automatically determining the network configuration data required for network installation of a plurality of network asset devices. Additionally, there exists the need to reduce the skillset required of users performing the commissioning of network asset devices on a network associated with a common infrastructure.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, the disclosed embodiments generally relate to providing an efficient computer tool and process for assigning assets to functional network groupings with network IP addresses, and determining network configurations (e.g., a subnet mask and DHCP reservation list) for configuring a network for use/commissioning of the assets. In certain embodiments, the subnet mask and DHCP reservation list is uploaded into router/firewall devices associated with the network. A noted advantage of the illustrated embodiments is it significantly reduces the skillset required by the user's (e.g., technicians) tasked for commissioning a plurality of assets at a certain location (e.g., an apartment building).

In accordance with one aspect of the illustrated embodiments, provided is a computer apparatus and process, which utilizes QR codes having specific information in conjunction with a specialized computer commissioning process and tool for creating and maintaining a hierarchical set of information regarding a plurality of assets to be commissioned at a certain geographic location (e.g., an apartment building). In certain embodiments, the hierarchical information includes a name, network address and subnet mask, and functional grouping relating to an asset. In accordance with other embodiments, and alternative to using QR codes, a portable computer device, such as a smart phone device, is configured and operative (e.g., via an app) to scan text from an asset for recognizing a printed MAC address from an asset's standard device label and additionally enables the asset installer (e.g., user of the portable computer device) to selectively select a device type, preferably from a drop-down list/menu.

The illustrated embodiments provide an efficient process that rapidly creates a DHCP IP reservation table and required subnet mask for a network associated with a common infrastructure (e.g., an apartment building network) for commissioning use of the assets on the network. The illustrated embodiments additionally generate configuration information for Base/Headend/Control units associated with functional groupings of certain assets.

In further, optional aspects, disclosed is a computer device and method for automatically generating network configurations for connecting a plurality of network asset devices to a common network. Receiving, in a network configuration device, is metadata associated with each of the plurality of network asse devices to be installed on the common network. Assigning, in the network configuration device, for each of the plurality of network asset devices, a defined functional group consisting of one or more network asset devices. And generating, by the network configuration device, a Dynamic Host Configuration Protocol (DHCP) reservation table defining a subnet mask for configuring the common network for implementation of the plurality of network asset devices for each defined functional group of network asset devices.

BRIEF DESCRIPTION OF THE DRAWINGS

So that those skilled in the art to which the subject disclosure appertains will readily understand how to make and use the devices and methods of the subject disclosure without undue experimentation, preferred illustrated embodiments thereof will be described in detail herein below with reference to certain figures, wherein.

DETAILED DESCRIPTION OF CERTAIN EMBODIMENTS

Figure 1:
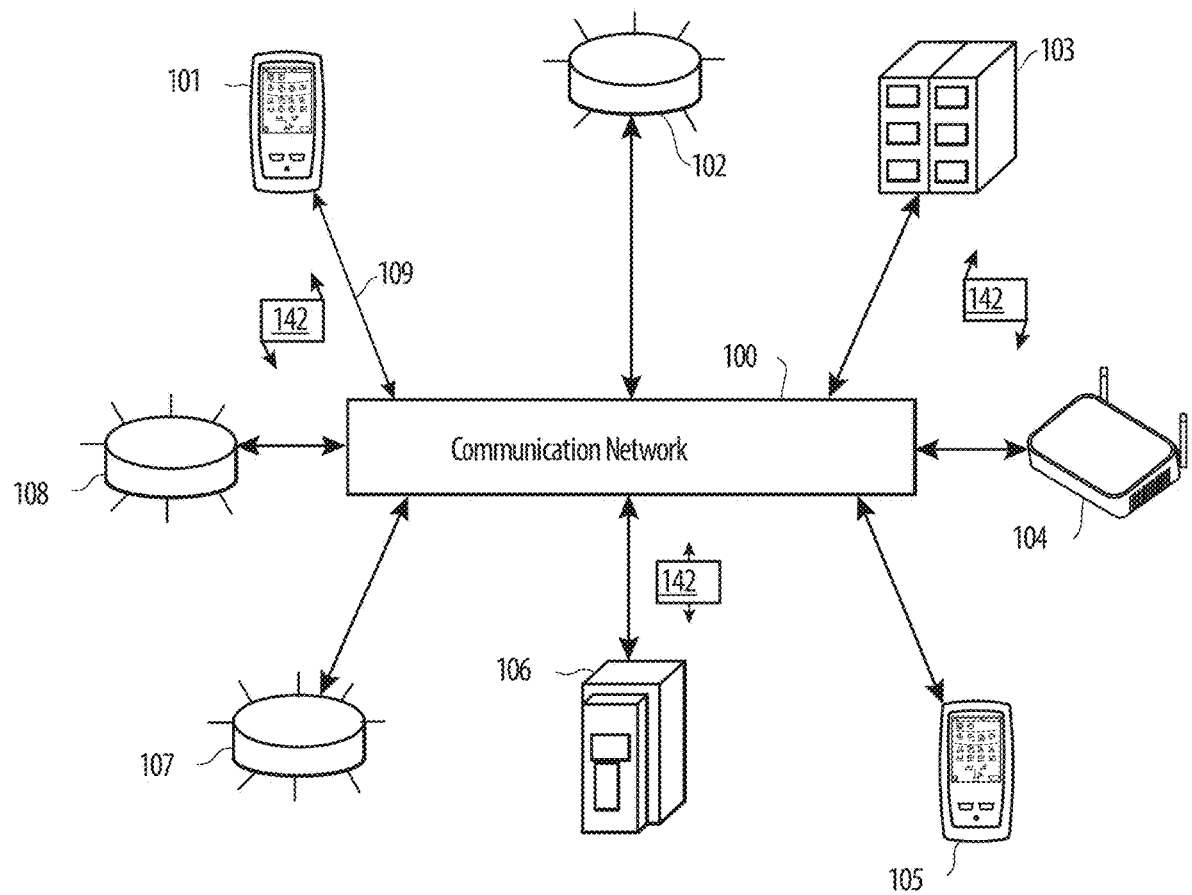
FIG. 1 illustrates an example communication network utilized with one or more of the illustrated embodiments.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program in accordance with the illustrated embodiments.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary communications network 100 in which below illustrated embodiments may be implemented. It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical light-paths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, asset commissioning apparatus/device 103, smart phone devices 105, server 106, routers 107, switches 108, databases, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the illustrated embodiments may be embodied as a system, method or computer program product. Accordingly, aspects of the illustrated embodiments may take the form of an entirely hardware embodiment, an entirely software embodiment (including firmware, resident software, micro-code, etc.) or an embodiment combining software and hardware aspects that may all generally be referred to herein as a "device", "apparatus", "module" or "system." Furthermore, aspects of the illustrated embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++, Python, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrated embodiments are described below with reference to flowchart illustrations and/or block diagrams of methods, apparatus (systems) and computer program products according to the illustrated embodiments. It will be understood that each block of the flowchart illustrations and/or block diagrams, and combinations of blocks in the flowchart illustrations and/or block diagrams, can be implemented by computer program instructions. These computer program instructions may be provided to a processor of a computer device, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium generate and maintain an inventory asset database including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
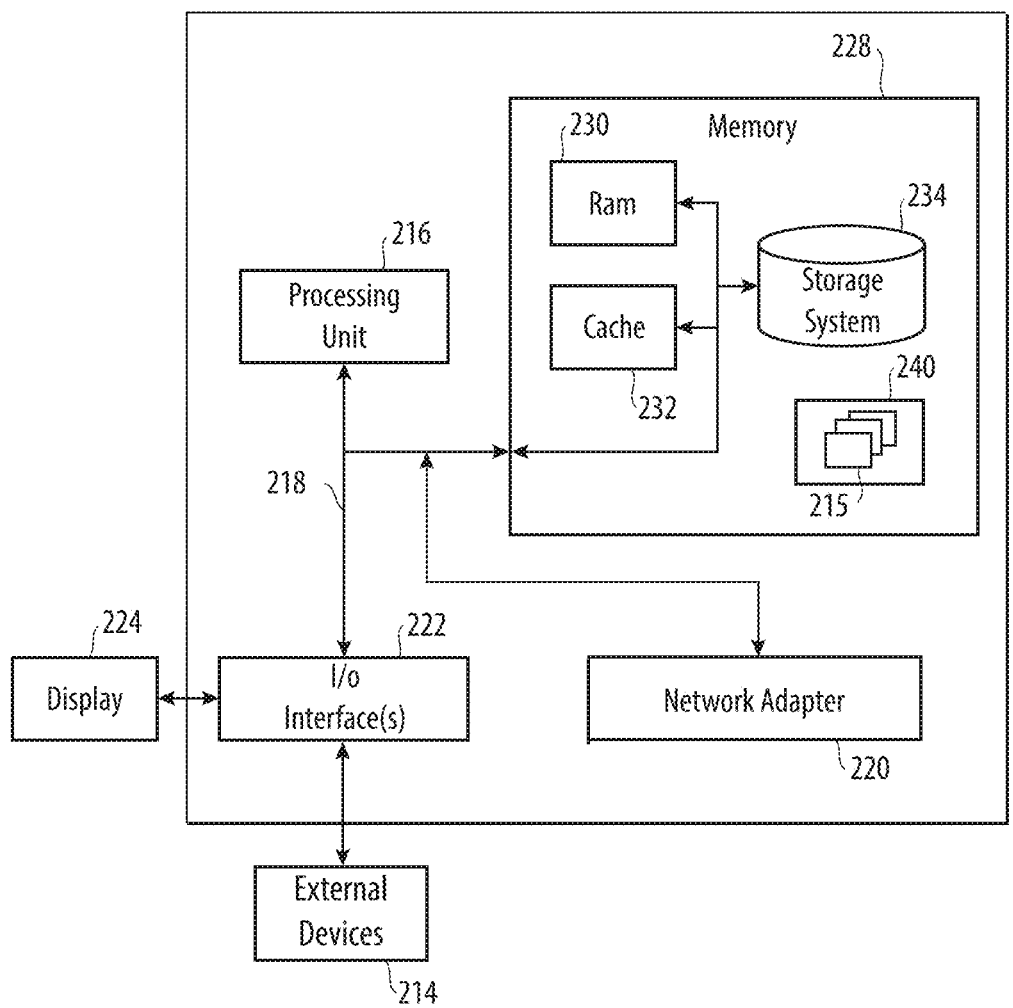
FIG. 2 illustrates an example network device/node utilized with one or more of the illustrated embodiments.

FIG. 2 is a schematic block diagram of an example network computing device 200 (e.g., asset commissioning apparatus/device 103, server 106, etc.) that may be used (or components thereof) with one or more embodiments described herein (e.g., as one of the nodes shown in the network 100) for providing a computer asset commissioning tool and process for commissioning network coupled asset devices, which, in accordance with the illustrated embodiments includes, but is not limited to: Operational Technology (OT); Industrial Internet of Things (IIoT) and Internet if Things (IoT) assets ("network asset devices") for operation at a certain physical location by designating assets to certain functional network asset groupings and by automatically assigning network IP addresses to assets, and determining network configurations (e.g., a subnet mask and DHCP reservation list) for configuring a network for use/commissioning of the assets. As explained above, in different embodiments these various devices are configured to communicate with each other in any suitable way, such as, for example, via communication network 100.

Device 200 is intended to represent any type of computer system capable of carrying out the teachings of various illustrated embodiments. Device 200 is only one example of a suitable system and is not intended to suggest any limitation as to the scope of use or functionality of the illustrated embodiments described herein.

It is to be understood and appreciated that computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, network PCs, minicomputer systems, and distributed data processing environments that include any of the above systems or devices, and the like. Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network 100. In a distributed data processing environment, program modules may be located in both local and remote computer system storage media including memory storage devices.

The components of device 200 may include, but are not limited to, one or more processors or processing units 216, a system memory 228, and a bus 218 that couples various system components including system memory 228 to processor 216. Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random-access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules (240) that are configured to carry out the functions of embodiments of illustrated embodiments such as for a computer asset commissioning tool and process for commissioning assets for operation at a certain physical location by designating assets to certain functional network asset groupings, and by automatically assigning network IP addresses to assets, and determining network configurations (e.g., a subnet mask and DHCP reservation list) for configuring a network for use/commissioning of the assets.

Program/utility 240, having a set (at least one) of program modules 215, such as an asset commissioning module, may be stored in memory 228 by way of example, and not limitation, as well as an operating system, one or more application programs, other program modules, and program data. Each of the operating systems, one or more application programs, other program modules, and program data or some combination thereof, may include an implementation of a networking environment. Program modules 215 generally carry out the functions and/or methodologies of the illustrated embodiments as described herein.

Device 200 may also communicate with one or more external devices 214 such as: a keyboard; a pointing device; a display 224; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which the below described illustrated embodiments may be implemented. FIGS. 1 and 2 are exemplary of a suitable environment and are not intended to suggest any limitation as to the structure, scope of use, or functionality of an illustrated embodiment. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

With the exemplary communication network 100 (FIG. 1) and computing device 200 (FIG. 2) being generally shown and discussed above, description of certain illustrated embodiments will now be provided. It is to be understood and appreciated that exemplary embodiments implementing one or more components of FIGS. 1-4 relate to a computer asset commissioning tool and process for commissioning assets for operation at a certain physical location by designating assets to certain functional network asset groupings by automatically assigning network IP addresses to assets, and determining network configurations (e.g., a subnet mask and DHCP reservation list) for configuring a network for use/commissioning of the assets.

Figure 3:
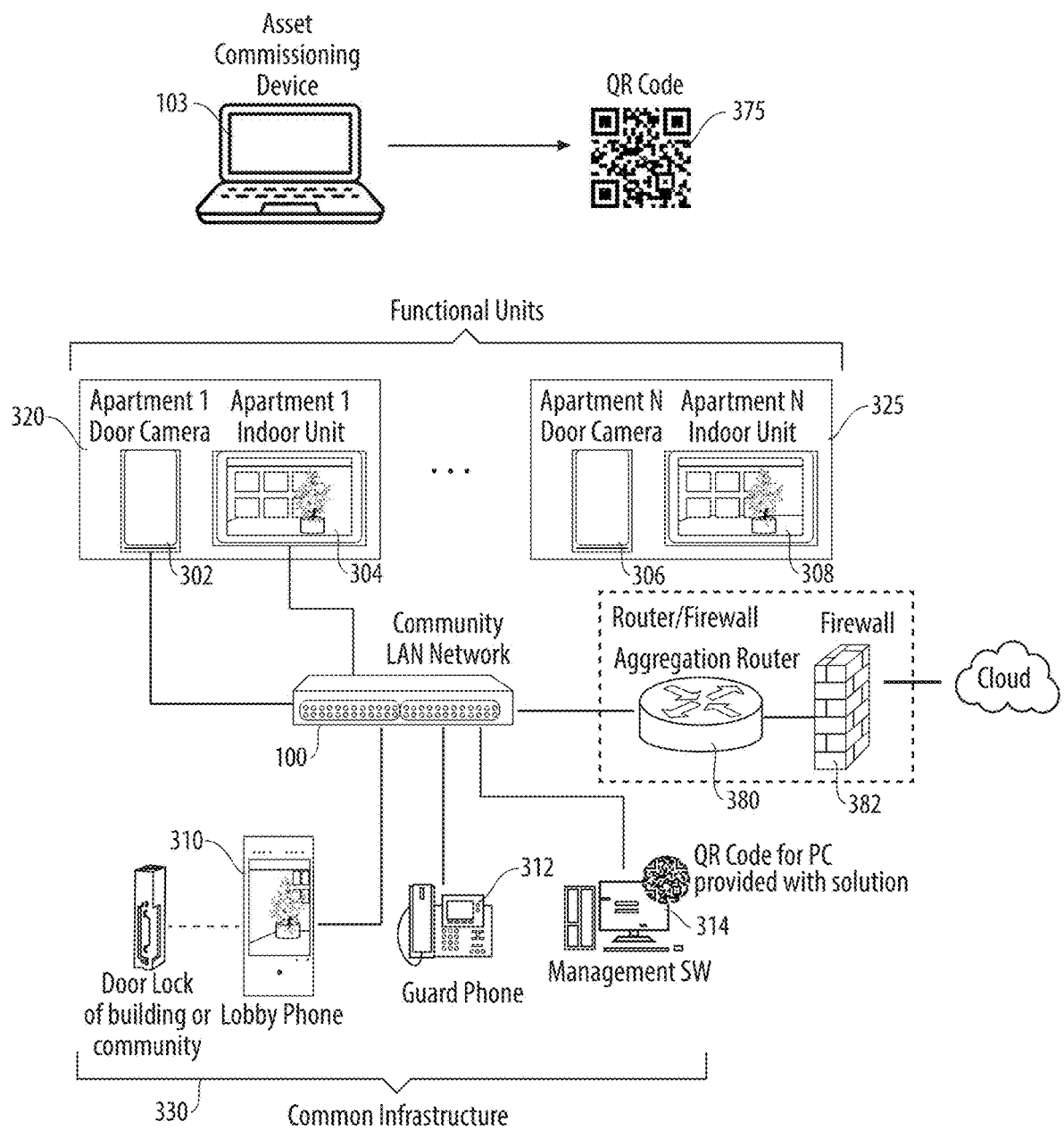
FIG. 3 is an exemplary system diagram depicting an asset commissioning tool for commissioning assets for operation on a network in accordance with the illustrated embodiments.

With reference now to FIG. 3, shown is a simplified exemplary embodiment depicting an asset commissioning tool/device 103 configured and operative to commission a plurality of network coupled assets (e.g., 302-314) for operation on a network 100 preferably at a certain geographic location 350 (e.g., an apartment building, commercial building, residential/commercial floor(s), spaces, and other geographic locations having a plurality of assets to be designated in certain functional groupings (as described herein)). It is to be appreciated and understood, in accordance with the illustrated embodiments, a network coupled asset device 103 may encompass an IP addressable device, such as (but not to be limited to Operational Technology (OT); Industrial Internet of Things (IIoT) and Internet if Things (IoT) assets). Additionally, it is to be understood and appreciated that in accordance with the illustrated embodiments, network coupled asset devices may also encompass non-IP based network coupled devices, such as (but not limited to) devices that couple to Zigbee and Z-Wave networks. Examples of such network coupled asset devices can include (and are not limited to): sensors, actuators, appliances, camera, gadgets, and various machines. For ease of description purposes, the network coupled asset devices (e.g., 302-314) described in accordance with the illustrated embodiments are described in the context of residential security related devices (e.g., cameras, phones, locks, door actuators) intended for use in apartments of a residential apartment building 350. However, it is to be understood and appreciated that the illustrated embodiments described herein are not to be understood to be limited for devices suitable for use in a residential building as the illustrated embodiments are to encompass many other types of network asset devices intended for use in many types of geographic locations.

With reference now to FIG. 3, a unique QR code 375 is preferably created by an asset commissioning device 103 (or another suitably configured device) to be provided/affixed on each asset (e.g., 302-314) to be commissioned for network use in a certain geographic location 350 (e.g., a residential apartment building 350). The information in the QR code includes metadata relating to the asset (e.g., 302) such as the type of device (e.g., a door camera), its serial number, and network MAC address. It is to be understood and appreciated the asset commissioning device 103 is preferably a portable computer device (e.g., a laptop or smartphone device) configured and operative (via a software application or smartphone app-module 240) to perform the functionality specified in accordance with the described illustrated embodiments. As described herein, the device 103 is configured and operative to designate assets (e.g., 302-314) for association with functional groups (e.g., 320, 325 and 330). In accordance with the illustrated embodiments, each functional group (e.g., common infrastructure 330) has a asset (e.g., Management SW 314) acting in the role of headend unit for that functional group (e.g., 330). The headend unit asset (e.g., 314) for each functional group (e.g., 330) can be either a separate device, or a single appliance providing the required coordination for each functional group (e.g., 320, 325 and 330). As with the other assets, a QR code 375 exists for each physical headend unit (e.g., 314) or multi-headed appliance (discussed further below).

As will be further described below with reference to FIG. 4, an asset commissioning process (400) is preferably commenced by creating and naming a new system file to be associated with the geographic location 350 the assets (e.g., 302-314) are to be commissioned with (e.g., Big Tower Apartment). Next, the commissioning device 103 requests input regarding the type of system being installed, preferably from a drop-down list of supported system types (e.g., Door Entry System). The commissioning device 103 additionally requests input for a base non-routable IP address starting point, (e.g., 192.168.0.10), and also requests for input of the number of assets (e.g., 302-314) to be commissioned in the common infrastructure 350 so as to reserve that number of IP addresses, and preferably with an additional number (N) of IP addresses for future growth of assets, starting at the beginning of the specified IP address range (e.g., 192.168.0.10). Next, for a particular asset (e.g., 302-314) to be commissioned for use in the common infrastructure 350, the user/technician of the device 103 preferably selects a "New Functional Group" action (e.g., via interaction with a GUI icon), followed by selecting a type of functional group (e.g., preferably from a list of functional group types supported by the device 300 for that system type—e.g., "Apartment Door Entry", or "Common Infrastructure"), and then preferably enters a name for the functional group, e.g., "Apartment 1". The device 103 then preferably scans the QR code 375 of each asset (e.g., 302, 304) in that functional grouping (e.g, 320) and then assigns an IP address and a name based on the functional group name and device type for each asset (e.g., 302, 304). The commissioning device 103 also creates an entry associated with the MAC address for each asset (e.g., 302, 304) in a DHCP reservation table, created by the commissioning device 103. Thus, when the asset (e.g., 302) is scanned, the asset installer (e.g., user of device 130) is prompted to select the role for that asset, e.g., "Front Door Camera". Preferably, each asset role is unique and can only be assigned once per functional group.

In accordance with the illustrated embodiments, the commissioning device 103 defaults selection to the primary role for that asset type (e.g., "door camera) but also enables a different selection to be made (e.g., pantry camera"), preferably each time a new functional group (e.g., 320) is created. If the role for an asset (e.g., 302) changes for the first asset, and the primary role was never assigned to an asset, the commissioning device 103 is preferably configured and operative to default to the new role selection for that first asset type role assignment when the next functional group is created and scanned by device 103. Preferably, the aforesaid functional group scanning ends by the commissioning device 103 when, for instance, a "Close Functional Group" selection provided by device 103 (e.g., preferably via a GUI) is user initiated. It is noted if an asset (e.g., 302-314) is missed or needs to be added at a later time, the commissioning device 103 is operational to enable a functional group to be selected (e.g., by selecting an "Add Device" button) such that another asset can be scanned and added to a certain predefined functional group (e.g., 320, 325 and 330).

Once all the QR codes 375 of the assets (e.g., 302-314) in all the functional groups (e.g., 320, 325 and 330) to be commissioned for use in the system/common infrastructure 350 are scanned, an end action is user initiated, for instance an "End System QR Scan" button is user selected on a GUI associated with device 103. It is noted that if there is a single asset (e.g., 314) providing multi-headend functionalities for all functional groups (e.g., 320, 325 and 330), a special functional group (e.g., "Multi-Headend Appliance" functional group) is selected on device 103 for that asset (e.g., 314) and its QR code is preferably scanned prior to the aforementioned ending the system QR code scan.

Once the aforesaid "End System QR Scan" button is selected on a GUI associated with the commissioning device 103, the commissioning device 103 is configured and operative to automatically (e.g., without user intervention) generate the subnet mask required for commissioning all assets (e.g., 302-314) for use on the network 100 associated with the system/common infrastructure 350, as well as generate the DHCP reservation table in a format compatible with the router 380 and/or firewall 382 being used on the network 100 for the system/common infrastructure 350. This information is then uploaded from the device 100 preferably into the router 380 and/or firewall 382. In accordance with the illustrated embodiments, the commissioning device 350 is further operative and configured to generate a list of assets (e.g., 306, 308) in each functional group (e.g., 325) that includes each asset's IP address, system type, device type, role, name information, and other relevant information, so as to load this information into each functional group's headend unit (e.g., 304, 308 and 314).

Alternatively and similar to above, once commissioning device 103 has completed the scanning of the QR codes 375 respectively associated with the assets (e.g., 302-314) for use on the network 100 associated with the system/common infrastructure 350, the user of commissioning device 103 then preferably enables the commissioning device 103 to update the aforesaid router 308 and/or firewall 382, and other device(s) with DHCP server functionality. Preferably, the commissioning device 103 downloads a current backup configuration file from the aforesaid router 380 and/or firewall 382, and other device(s) with DHCP server functionality associated with the network 100 for the system/common infrastructure 350 (e.g., one of several router/firewall models supported by the commission device 103) so as to modify the DHCP reservation section of the aforesaid router 380 and/or firewall 382, and other device(s) with DHCP server functionality to incorporate each IP address to MAC address assignments associated with the scanned assets (e.g., 302-314). The subnet mask section of the aforesaid router 380 and/or firewall 382, and other device(s) with DHCP server functionality for network 100 is then preferably modified by the commissioning device 103 contingent upon the number of total assets (e.g., 302-314) in the system/common infrastructure 350. The commissioning device 103 is then preferably configured and operative to restore the backup file to the aforesaid router 380 and/or firewall 382, and other device(s) with DHCP server functionality, and then preferably instructs the router 308 and/or firewall 382 to reboot with its new/updated aforesaid configuration so as to enable operation of the assets (e.g., 302-314) on the network 100 of the common infrastructure 350.

In accordance with other illustrated embodiments, and alternative to using QR codes, the commissioning device 103 preferably consists of a portable computer device, such as a smart phone device, being configured and operative (e.g., preferably via an app) to scan text from an asset (e.g., 302-314) for recognizing a printed MAC address from an asset's standard device label and additionally enables the asset installer (e.g., user of the portable computer commissioning device 103) to selectively select a device type, preferably from a drop-down list/menu on an display interface associate with device 103.

Figure 4:
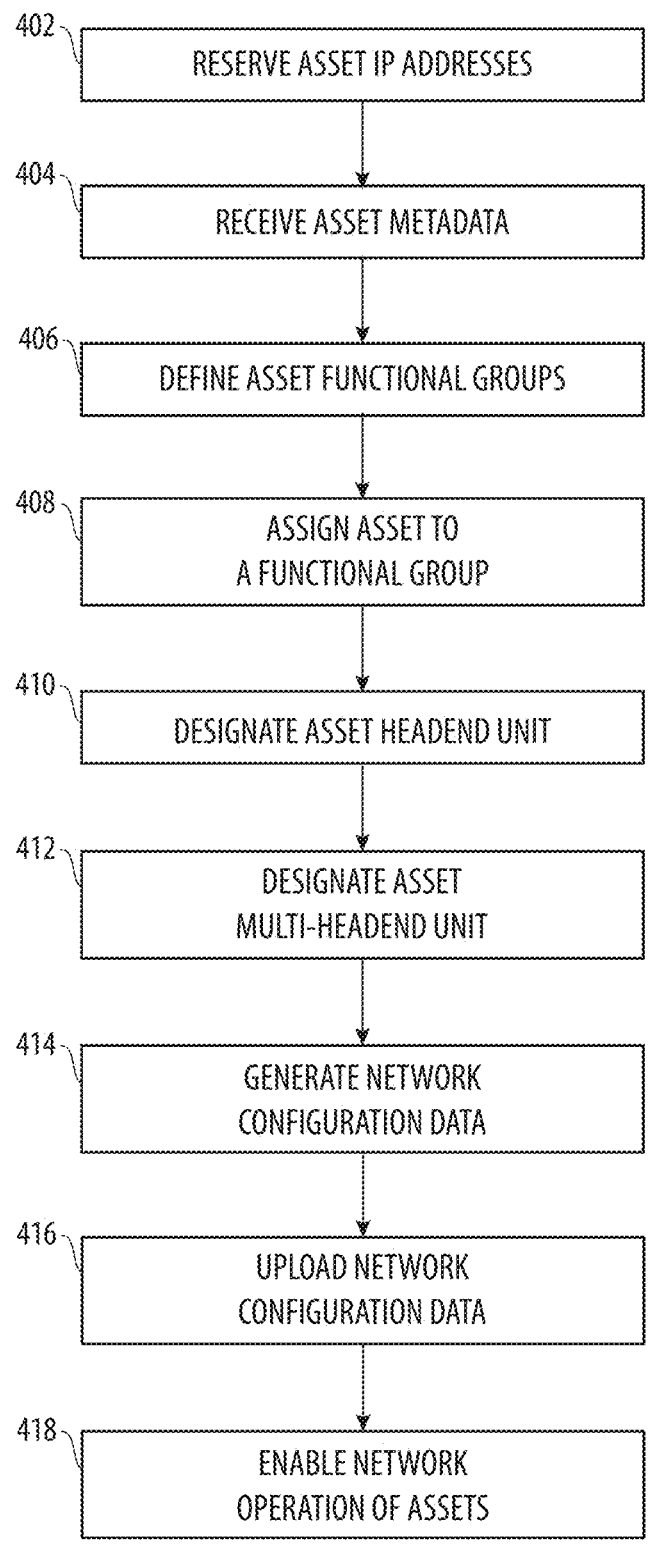
FIG. 4 depicts a flow chart illustrating a computer process for commissioning assets for operation on a network utilizing the asset commissioning tool of FIG. 3 in accordance with the illustrated embodiments.

With a brief description of operation of certain illustrated embodiments provided above with reference to FIG. 3, with reference now to FIG. 4 (and with continuing reference to FIGS. 1-3), a computer-implemented process 400 for commissioning assets (e.g., network asset devices 302-314) for operation on a network 100 at a certain physical location (350) by designating assets (302-314) to certain functional network asset groupings (320, 325 and 330), automatically assigning network IP addresses to assets (302-314), and determining network configurations (e.g., a subnet mask and DHCP reservation list) for configuring a network 100 for use/commissioning of the assets (302-314) is now described.

Starting at step 402, defined by a user via the commissioning device 103 is preferably a base non-routable IP address starting point, (e.g., 192.168.0.10), and the number of assets (e.g., 302-314) to be commissioned in a common infrastructure 350 so as to reserve that number of IP addresses for use on a network 100 associated with the common infrastructure, and preferably with an additional number (N) of IP addresses for future growth, starting at the beginning of the specified IP address range (e.g., 192.168.0.10). Next at step 404, metadata is received relating to an asset (e.g., 302) to be commissioned for use on the network 100 of the common infrastructure 350, wherein the metadata may include (but is not limited to) type of device (e.g., a door camera), serial number, and network MAC address. As mentioned above, the metadata is preferably acquired either via a QR code 375 associated with an asset (e.g., 302-314) or via other scanning means such as scanning a MAC address associated with an asset (e.g., 302-314) by a suitable scanner device associated with a commissioning device 103.

At step 406, asset functional groups (e.g., 320, 325 and 33) are defined by the commissioning device 103 wherein a defined functional group (e.g., 320) defines one or more assets (e.g., 302 and 304) to be grouped for use with one another on the network 100 of the common infrastructure 350. At step 408, via the commissioning device 103, an asset (e.g., 304), preferably via its received metadata (step 404), is assigned for operation with a certain functional group (e.g., 320) consisting of other assets (e.g., 302) it is intended to operate in conjunction with. In certain embodiments, an asset (e.g., 304) in each functional group (e.g., 320) is designated as a "headend unit" for that functional group (e.g., 320). It is noted that headend unit asset (e.g., 304) for each functional group (e.g., 320) can be either a separate device, or a single appliance providing the required coordination for each functional group (e.g., 320, 325 and 330). Additionally, at step 412, if there is a single asset (e.g., 314) providing multi-headend functionalities for all functional groups (e.g., 320, 325 and 330), a special functional group (e.g., "Multi-Headend Appliance" functional group) is designated by the commissioning device 103 for that asset (e.g., 314).

Once all the assets (e.g., 302-314) have been entered by the commissioning device 103 for use on the network 100 of the common infrastructure 350, at step 414, the commissioning device 103 automatically determines the subnet mask required for commissioning all assets (e.g., 302-314) for use on the network 100 associated with the common infrastructure 350, and also preferably generates a DHCP reservation table in a format compatible with a router 380 and/or firewall 382, and other device(s) with DHCP server functionality being used on the network 100 for the common infrastructure 350. At step 416, this network configuration data (e.g., subnet mask and DHCP reservation table) is then uploaded from the commissioning device 100 preferably into the router 380 and/or firewall 382, and other device(s) with DHCP server functionality. Then, at step 418, each asset (e.g., 302-314) is functional for use on the network 100 of the common infrastructure 350.

Additionally, in accordance with certain illustrated embodiments, a list of assets (e.g., 306, 308) in each functional group (e.g., 325) is generated by the commissioning device 103 that preferably includes each asset's IP address, system type, device type, role, and name information so as to load this information into each functional group's headend unit (e.g., 304, 308 and 314).

As evident from the below description, the illustrated embodiments are particularly advantageous in that large networked systems having a plurality of network assets are quickly commissioned without error and using a workforce with a basic skillset that does not require fundamental knowledge of networking.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer-implemented method for automatically generating network configurations for connecting a plurality of network asset devices to a common network, comprising:
   receiving, in a network configuration device, metadata associated with each of the plurality of network asset devices to be installed on the common network;
   assigning, in the network configuration device, for each of the plurality of network asset devices, a defined functional group consisting of one or more network asset devices; and
   generating, by the network configuration device, a Dynamic Host Configuration Protocol (DHCP) reservation table defining a subnet mask for configuring the common network for implementation of the plurality of network asset devices for each defined functional group of network asset devices.

2. The computer-implemented method as recited in claim 1, wherein the metadata is received in the network configuration device by scanning a QR code associated with an network asset device, which QR codes indicates the metadata.

3. The computer-implemented method as recited in claim 1, further including: reserving, by the network configuration device, a number (N) of IP addresses for use on the common network, wherein the number N is greater than the number of plurality of network asset devices for enabling future network configuration of network asset devices on the common network additional to the plurality of network asset devices.

4. The computer-implemented method as recited in claim 1, wherein a headend designation status is selected for a designated network asset device in a certain functional group such that the network asset device designated as the headend unit is functional to provide coordination for each network asset device in the certain functional group,
whereby the network configuration device generates a listing of each network asset device in each certain functional group, and
whereby the network configuration device uploads the network asset device listing for each certain functional group to a headend unit for a corresponding certain functional group.

5. The computer-implemented method as recited in claim 1, wherein a multi-headend designation status is selected for a network asset device from the plurality of network asset devices such that the network asset device designated as the multi-headend unit is functional to provide coordination for network asset devices in a plurality of functional groups.

6. A computer-implemented method for automatically providing network configurations for connecting a plurality of network asset devices to a common network, comprising:
creating, using a computer device, a master functional group each of the one or more locational functional groups it is to be associated with;
defining, in the computer device, a type of system file corresponding to a certain functionality one or more of the plurality of network asset devices is to perform;
inputting, into the computer device, an initial number of network asset devices to be associated with the master functional group to reserve a number of IP addresses in a router for the common computer network corresponding to the initial number of network asset devices;
defining, in the computer device, a functional group file corresponding to a certain physical location in the master functional group one or more of the initial number of network asset devices is to be associated with for performing the type of system file certain functionality;
inputting, in the computer device, metadata associated with a network asset device to be associated with the functional group file wherein the metadata includes at least a MAC address for the network asset device, and assigning an IP address from reserved IP addresses to the MAC address for the network asset device; and
generating, by the computer a device, upon determining all the plurality of network asset devices have been associated with a certain functional group file, a subnet mask for use by the router containing at least the MAC address and assigned IP address for each of the initial number of network asset devices associated with a certain functional group for enabling operation in the master functional group, via the common computer network.

7. The computer-implemented method as recited in claim 6, wherein each network asset device is provided with QR code indicating the network asset device's metadata whereby a scanning device associated with the computer device scans the QR code for inputting the network asset device metadata.

8. The computer-implemented method as recited in claim 7, wherein after scanning a QR code, a role for the network asset device associated with the scanned QR role is assigned, which role is unique relative to roles assigned to other network asset devices in the same functional group.

9. The computer-implemented method as recited in claim 8, wherein the QR code includes metadata further identifying a network asset device's serial number and type of device indication.

10. The computer-implemented method as recited in claim 6, wherein a headend designation status is selected for a designated network asset device in a certain functional group such that the network asset device designated as the headend unit is functional to provide coordination for each network asset device in the certain functional group.

11. The computer-implemented method as recited in claim 10, further including generating, by the computer device for each functional group, a listing of each network asset device in each functional group which includes each network asset device's IP address, system type identifier, device type identifier, operational role and device name for each network asset device in a certain functional group, wherein the listing for each certain functional group is uploaded to the headend designated network asset device for the certain functional group.

12. The computer-implemented method as recited in claim 6, wherein a multi-headend designation status is selected for a network asset device in a certain functional group such that the network asset device designated as the multi-headend unit is functional to provide coordination for all network asset devices in all functional groups.

13. The computer-implemented method as recited in claim 6, further including: generating, by the computer device, a DHCP reservation table for the MAC address and assigned IP address for each of the initial number of network asset devices, in a format compatible for use with the router, a firewall and/or DHCP server of the common computer network for configuring the router, a firewall and/or DHCP server in accordance with DHCP reservation table.

14. The computer-implemented method as recited in claim 13, wherein the computer device electronically uploads the subnet mask and DHCP reservation table to the router, a firewall and/or DHCP server.

15. The computer-implemented method as recited in claim 1, wherein reserving the number of IP addresses in the router, a firewall and/or DHCP server further includes reserving an additional (N) number of IP addresses in the router, a firewall and/or DHCP server for enabling network asset devices additional to the initial number of network asset devices to be included in the master functional group.

16. A computer device for automatically generating network configurations for connecting a plurality of network asset devices to a common network, comprising:
a memory configured to store instructions;
a processor disposed in communication with said memory, wherein said processor upon execution of the instructions is configured to:
receive metadata associated with each of the plurality of network asset devices to be installed on the common network;
assign for each of the plurality of network asset devices, a defined functional group consisting of one or more network asset devices; and
generate a Dynamic Host Configuration Protocol (DHCP) reservation table defining a subnet mask for configuring the common network for implementation of the plurality of network asset devices in accordance with each defined functional group of network asset devices.

17. The computer device as recited in claim 16, wherein the metadata is received in the network configuration device by scanning a QR code associated with a network asset device, which QR codes indicates the metadata.

18. The computer device as recited in claim 16, further including; reserving, by the network configuration device, a number (N) of IP addresses for use on the common network wherein the number N is greater than the number of plurality of network asset devices for enabling future network configuration of network asset devices on the common network additional to the plurality of network asset devices.

19. The computer device as recited in claim 16, wherein a headend designation status is selected for a designated network asset device in a certain functional group such that the network asset device designated as the headend unit is functional to provide coordination for each network asset device in the certain functional group,
- whereby the network configuration device generates a listing of each network asset device in each certain functional group, and
- whereby the network configuration device uploads the network asset device listing for each certain functional group to a headend unit for a corresponding certain functional group.

20. The computer device as recited in claim 16, wherein a multi-headend designation status is selected for a network asset device from the plurality of network asset devices such that the network asset device designated as the multi-headend unit is functional to provide coordination for network asset devices in a plurality of functional groups.

* * * * *